US012349241B2

(12) United States Patent
Ishikawa et al.

(10) Patent No.: US 12,349,241 B2

(45) Date of Patent: Jul. 1, 2025

(54) CERAMIC HEATER AND METHOD OF MANUFACTURING THE SAME

(71) Applicant: NGK INSULATORS, LTD., Nagoya (JP)

(72) Inventors: Masaki Ishikawa, Handa (JP); Shuichiro Motoyama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1049 days.

(21) Appl. No.: 17/301,627

(22) Filed: Apr. 9, 2021

(65) Prior Publication Data

US 2021/0227639 A1 Jul. 22, 2021

Related U.S. Application Data

(63) Continuation of application No. PCT/JP2020/001239, filed on Jan. 16, 2020.

(30) Foreign Application Priority Data

Jan. 25, 2019 (JP) ................................ 2019-011299

(51) Int. Cl.
*H05B 3/14* (2006.01)
*H05B 3/10* (2006.01)

(52) U.S. Cl.
CPC ............... *H05B 3/143* (2013.01); *H05B 3/10* (2013.01); *H05B 3/141* (2013.01); *H05B 2203/017* (2013.01)

(58) Field of Classification Search
CPC .......... H05B 3/143; H05B 3/10; H05B 3/141; H05B 3/02
See application file for complete search history.

(56) References Cited

U.S. PATENT DOCUMENTS 5,683,606 A * 11/1997 Ushikoshi ............... C23C 16/46 219/544
7,279,661 B2 * 10/2007 Okajima .................. H05B 3/68 219/544

(Continued)

FOREIGN PATENT DOCUMENTS

JP H06-077148 A1 3/1994
JP H06-252055 A 9/1994

(Continued)

OTHER PUBLICATIONS

International Search Report and Written Opinion (Application No. PCT/JP2020/001239) dated Mar. 17, 2020.

(Continued)

*Primary Examiner* — Steven W Crabb
*Assistant Examiner* — Fahmida Ferdousi
(74) *Attorney, Agent, or Firm* — BURR PATENT LAW, PLLC

(57) ABSTRACT

A ceramic heater includes a ceramic plate. The ceramic plate has a wafer placement surface, and is divided into an inner-peripheral zone having a circular shape and an outer-peripheral zone having an annular shape. An inner-peripheral resistance heating element that is composed of high-melting-point metal is disposed in the inner-peripheral zone. An outer-peripheral resistance heating element that has at least a surface composed of metal carbide is disposed in the outer-peripheral zone.

9 Claims, 5 Drawing Sheets

(56) References Cited

U.S. PATENT DOCUMENTS

| | | | | |
|---|---|---|---|---|
| 2003/0075537 | A1 | 4/2003 | Okajima et al. | |
| 2006/0096972 | A1* | 5/2006 | Nakamura | H01L 21/67103 219/544 |
| 2008/0110874 | A1* | 5/2008 | Hayashi | H01L 21/67103 219/468.1 |
| 2013/0200067 | A1* | 8/2013 | Hirano | H05B 3/265 219/544 |

FOREIGN PATENT DOCUMENTS

| | | | |
|---|---|---|---|
| JP | 2001-313155 | A | 11/2001 |
| JP | 2001-338747 | A | 12/2001 |
| JP | 2006-228633 | A1 | 8/2006 |
| JP | 3897563 | B2 | 3/2007 |
| JP | 2017-147126 | A1 | 8/2017 |
| TW | 201223915 | A1 | 6/2012 |

OTHER PUBLICATIONS

Korean Office Action (Application No. 10-2021-7013823) dated Mar. 14, 2023 (with English translation).

English translation of International Preliminary Report on Patentability (Chapter I) dated Aug. 5, 2021 (Application No. PCT/JP2020/001239).

Taiwanese Office Action (Application No. 109101685) dated Jun. 6, 2023 (6 pages).

* cited by examiner

CERAMIC HEATER AND METHOD OF MANUFACTURING THE SAME

BACKGROUND OF THE INVENTION

1. Field of the Invention

The present invention relates to a ceramic heater and a method of manufacturing the ceramic heater.

2. Description of the Related Art

For a semiconductor-manufacturing apparatus, a ceramic heater that heats a wafer is used. A so-called two-zone heater is known as such a ceramic heater. In a heater known as this kind of two-zone heater, as disclosed in PTL 1, an inner-peripheral resistance heating element and an outer-peripheral resistance heating element are embedded in a ceramic base on the same plane, and heat generated from the resistance heating elements is separately controlled by separately applying a voltage to the resistance heating elements. Each resistance heating element includes a coil composed of high-melting-point metal such as tungsten.

CITATION LIST

Patent Literature

PTL 1: Japanese Patent No. 3897563

SUMMARY OF THE INVENTION

However, PTL 1 has a problem in that an outer peripheral portion is likely to have temperature variance. An investigation into the causes of the problem has revealed that carbonization of a part of the outer-peripheral resistance heating element is one of the causes. That is, the outer peripheral portion is greatly affected by the temperature variance of a firing furnace when ceramics is fired, and the outer peripheral portion of the ceramic heater is likely to have a high temperature. However, a coil that is embedded in the outer peripheral portion reacts with carbon that is contained in a ceramic base and partly changes into metal carbide. In the case where a plate is stacked in a hot press furnace for firing, there are a carbon jig and mold on the outer circumference of the plate. Carbon therein enters from the outer circumference of the plate, and consequently, the carbon concentration of the outer circumference of the plate increases. For this reason, the coil at the outer circumference of the plate is likely to be carbonized. The volume resistivity of metal carbide differs from that of metal before carbonization. For this reason, the difference in the amount of heat generation is made between a metal carbide portion and the other portion when the outer-peripheral resistance heating element is energized. Consequently, temperature variance occurs at the outer peripheral portion.

The present invention has been accomplished to solve the problems, and it is a main object of the present invention to inhibit temperature variance from occurring at an outer peripheral portion.

A ceramic heater of the present invention includes:

a ceramic plate that has a wafer placement surface and that has an inner-peripheral zone having a circular shape and an outer-peripheral zone having an annular shape;

an inner-peripheral resistance heating element that is disposed in the inner-peripheral zone and that is composed of high-melting-point metal; and an outer-peripheral resistance heating element that is disposed in the outer-peripheral zone and that has at least a surface composed of metal carbide.

In the ceramic heater, the ceramic plate contains the carbon component as an impurity. An outer peripheral portion of the ceramic heater is likely to have a high temperature, and the carbon concentration thereof increases due to carbon that enters from the outer circumference. For this reason, the outer-peripheral resistance heating element that is disposed in the outer-peripheral zone is likely to be carbonized as a result of reaction with the carbon component that is contained in the ceramic plate. According to the present embodiment, however, the outer-peripheral resistance heating element has at least the surface composed of the metal carbide (the entire outer-peripheral resistance heating element may be composed of the metal carbide) and is not further carbonized. That is, the amount of heat generation of the outer-peripheral resistance heating element does not become non-uniform. Accordingly, temperature variance can be inhibited from occurring at the outer peripheral portion. The inner-peripheral resistance heating element is manufactured by using the high-melting-point metal but not by using metal carbide because metal carbide (for example, carbide of Mo or W) is very hard, and installation work when the inner-peripheral resistance heating element is embedded, and work when the inner-peripheral resistance heating element is formed (for example, a coil shape) by using a wire are difficult.

In the ceramic heater according to the present invention, the inner-peripheral resistance heating element and the outer-peripheral resistance heating element may be connected to respective different power supplies. This enables separate temperature control of the inner-peripheral zone and the outer-peripheral zone of the ceramic heater.

In the ceramic heater according to the present invention, the inner-peripheral resistance heating element and the outer-peripheral resistance heating element may be connected to each other in series and are connected to a single power supply. This enables the temperatures of the inner-peripheral zone and the outer-peripheral zone of the ceramic heater to be controlled by using the common power supply.

In the ceramic heater according to the present invention, the high-melting-point metal is preferably at least one kind of metal selected from a group consisting of tungsten, molybdenum, and an alloy thereof, and the metal carbide is preferably carbide of high-melting-point metal (for example, tungsten carbide or molybdenum carbide).

In the ceramic heater according to the present invention, at least a portion of the outer-peripheral resistance heating element that is located at an outermost peripheral portion of the outer-peripheral zone may be composed of metal carbide. The outermost peripheral portion of the outer-peripheral zone is most likely to have a high temperature in the outer-peripheral zone. For this reason, it is significant that the portion of the outer-peripheral resistance heating element that is located at the outermost peripheral portion is manufactured by using the metal carbide.

In the ceramic heater according to the present invention, the outer-peripheral resistance heating element preferably has a two-dimensional shape. Examples of the two-dimensional shape include a ribbon shape (a flat elongated shape) or a mesh shape. In some cases, the workability of metal carbide is poor, and it is difficult to mold into a three-dimensional shape (for example, a coil). However, the two-dimensional shape facilitates manufacturing by printing.

In the ceramic heater according to the present invention, the inner-peripheral resistance heating element may not include or may include a thin film composed of carbide of the high-melting-point metal on a surface. The thickness of the thin film is preferably thickness (for example, several μm) adjusted to such an extent that the characteristics of the resistance heating element composed of the high-melting-point metal are not affected.

A method of manufacturing a ceramic heater according to the present invention includes a firing step of firing a pre-firing ceramic precursor that includes an inner-peripheral resistance heating element that is embedded in an inner-peripheral zone and an outer-peripheral resistance heating element that is embedded in an outer-peripheral zone in an inert atmosphere in a condition in which at least one of a jig, a mold, and a firing furnace used for firing is composed of carbon to manufacture a ceramic plate, and a preprocessing step of preparing a resistance heating element composed of high-melting-point metal before the outer-peripheral resistance heating element is embedded in the ceramic precursor, carbonizing at least a surface of the resistance heating element composed of the high-melting-point metal to manufacture the outer-peripheral resistance heating element, and embedding the outer-peripheral resistance heating element in the ceramic precursor.

In the method of manufacturing the ceramic heater, the outer-peripheral resistance heating element is not further carbonized because there is carbon in the atmosphere in the firing step, but at least the surface of the outer-peripheral resistance heating element is carbonized.

In the method of manufacturing the ceramic heater according to the present invention, the entire resistance heating element composed of the high-melting-point metal may be carbonized in the preprocessing step.

DETAILED DESCRIPTION OF THE INVENTION

Figure 1:
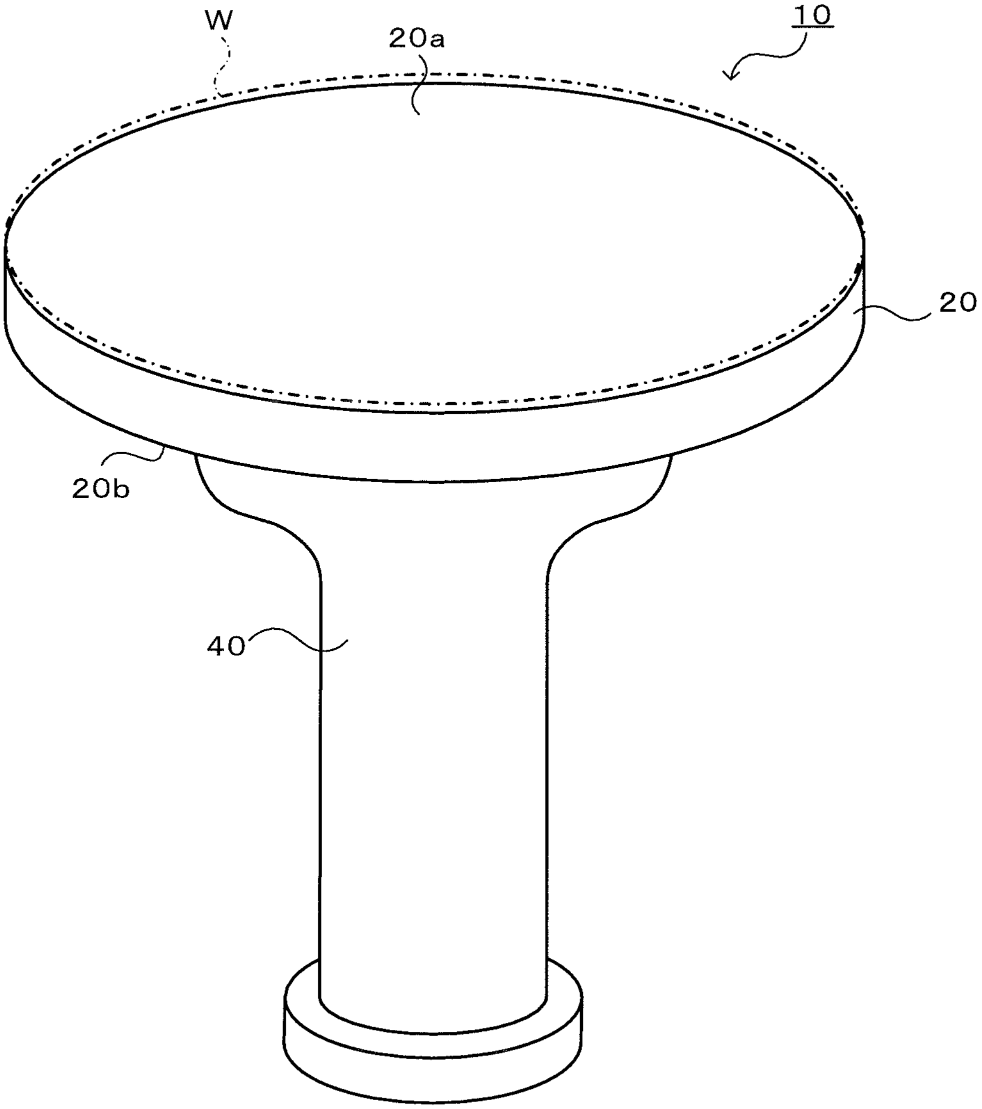
FIG. 1 is a perspective view of a ceramic heater 10.
Figure 2:
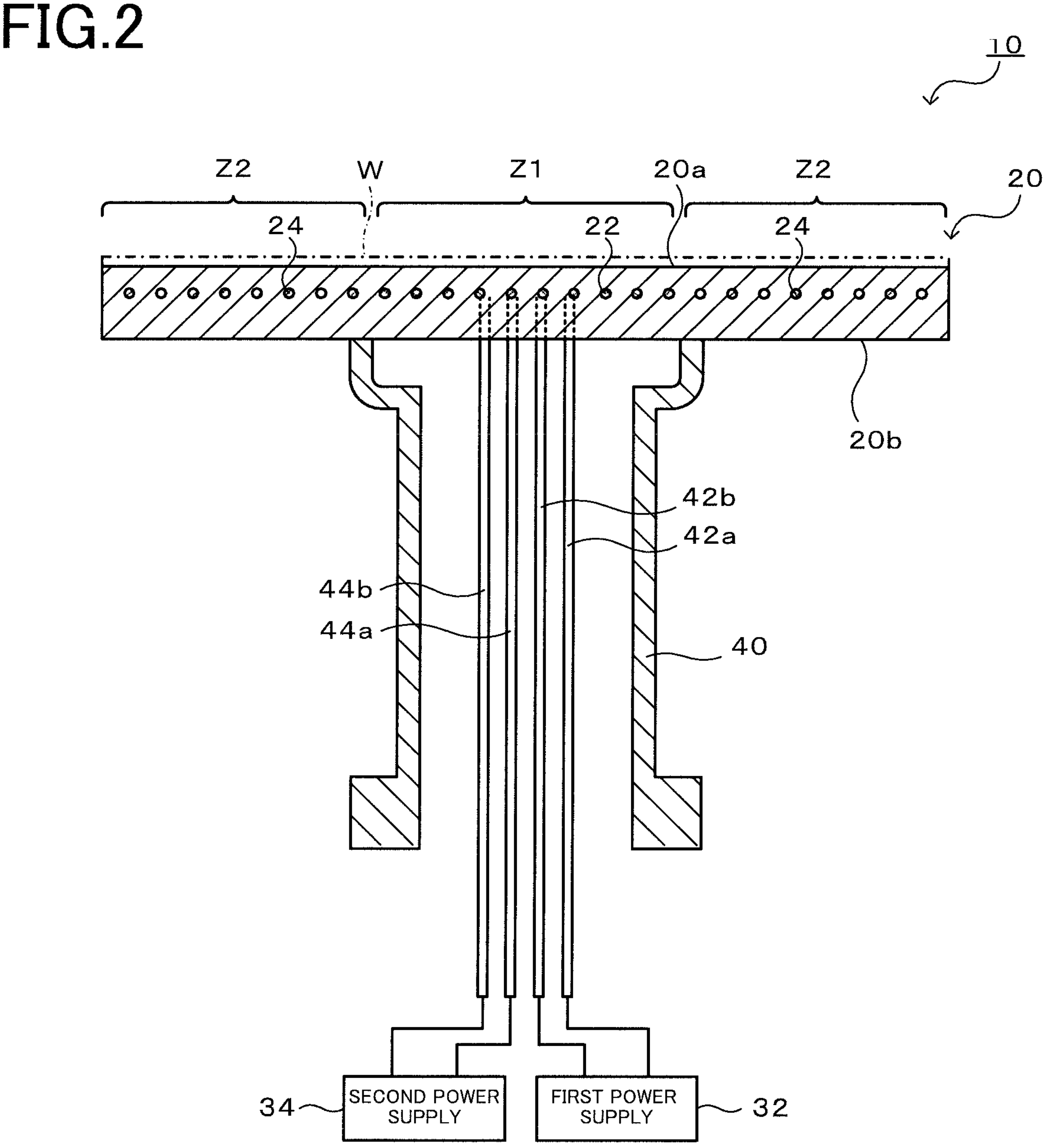
FIG. 2 is a longitudinal sectional view of the ceramic heater 10.
Figure 3:
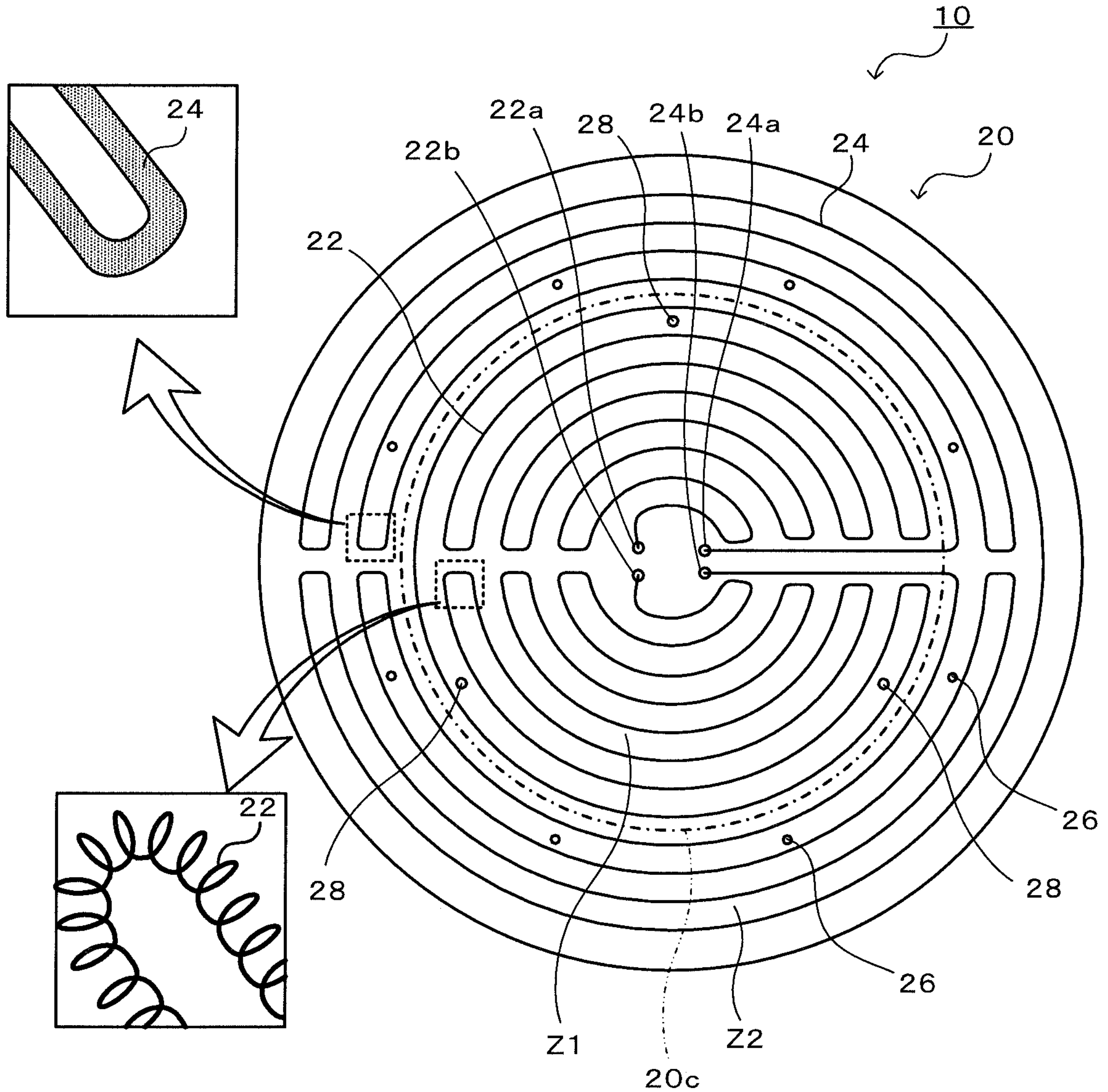
FIG. 3 is a sectional view of a ceramic plate 20 taken along a plane parallel with resistance heating elements 22 and 24 and viewed from above.

A preferred embodiment of the present invention will hereinafter be described with reference to the drawings. FIG. 1 is a perspective view of a ceramic heater 10. FIG. 2 is a longitudinal sectional view (a sectional view of the ceramic heater 10 taken along a plane containing a central axis) of the ceramic heater 10. FIG. 3 is a sectional view of a ceramic plate 20 taken along a plane parallel with resistance heating elements 22 and 24 and viewed from above. FIG. 3 illustrates the ceramic plate 20 substantially viewed from a wafer placement surface 20*a*. In FIG. 3, hatching representing a section is omitted.

The ceramic heater 10 is used to heat a wafer that is subjected to a process such as etching or CVD and is installed in a vacuum chamber not illustrated. The ceramic heater 10 includes the ceramic plate 20 that has the wafer placement surface 20*a* and that is discoid, and a tubular shaft 40 that is joined coaxially with the ceramic plate 20 to a surface (a back surface) 20*b* of the ceramic plate 20 opposite the wafer placement surface 20*a*.

The ceramic plate 20 is a discoid plate composed of a ceramic material, representatively, aluminum nitride or alumina. The diameter of the ceramic plate 20 is, for example, about 300 mm. The ceramic plate 20 contains a carbon component as an impurity. The reason why the ceramic plate 20 contains the carbon component is that when the ceramic plate 20 is fired, a carbon jig and mold are used, and a carbon firing furnace is used. Fine irregularities are formed on the wafer placement surface 20*a* of the ceramic plate 20 by an embossing process, although these are not illustrated. An imaginary boundary 20*c* (see FIG. 3) that is concentric with the ceramic plate 20 divides the ceramic plate 20 into an inner-peripheral zone Z1 that has a small circular shape and an outer-peripheral zone 22 that has an annular shape. The diameter of the imaginary boundary 20*c* is, for example, about 200 mm. An inner-peripheral resistance heating element 22 is embedded in the inner-peripheral zone Z1 of the ceramic plate 20. An outer-peripheral resistance heating element 24 is embedded in the outer-peripheral zone Z2. The resistance heating elements 22 and 24 are disposed on the same plane parallel with the wafer placement surface 20*a*.

As illustrated in FIG. 3, the ceramic plate 20 has gas holes 26. The gas holes 26 extend through the ceramic plate 20 from the back surface 20*b* to the wafer placement surface 20*a*. Gas is supplied to spaces between the irregularities that are formed on the wafer placement surface 20*a* and a wafer W that is placed on the wafer placement surface 20*a*. The gas that is supplied to the spaces improves heat conduction between the wafer placement surface 20*a* and the wafer W. The ceramic plate 20 also has multiple lift pin holes 28. The lift pin holes 28 extend through the ceramic plate 20 from the back surface 20*b* to the wafer placement surface 20*a*, and lift pins, not illustrated, are inserted therein. The lift pins lift the wafer W that is placed on the wafer placement surface 20*a*. According to the present embodiment, the lift pin holes 28 are concentrically arranged at a regular interval, and the number thereof is three.

As illustrated in FIG. 3, the inner-peripheral resistance heating element 22 extends from one of a pair of terminals 22*a* and 22*b* disposed on a central portion (a region of the back surface 20*b* of the ceramic plate 20 that is surrounded by the tubular shaft 40) of the ceramic plate 20, is folded at folded portions in a one-stroke pattern, is wired over the substantially entire inner-peripheral zone Z1, and reaches the other of the pair of the terminals 22*a* and 22*b*. The inner-peripheral resistance heating element 22 is a coil that does not include a thin film composed of carbide on a surface and that is composed of high-melting-point metal. Examples of the high-melting-point metal include tungsten, molybdenum, and an alloy thereof. Examples of the volume resistivity at 20° C. are $5.5\times10^{6}$ [Ω·m] for tungsten and $5.2\times10^{8}$ [Ω·m] for molybdenum.

As illustrated in FIG. 3, the outer-peripheral resistance heating element 24 extends from one of a pair of terminals 24*a* and 24*b* disposed on the central portion of the ceramic plate 20, is folded at folded portions in a one-stroke pattern, is wired over the substantially entire outer-peripheral zone Z2, and reaches the other of the pair of the terminals 24*a* and 24*b*. The outer-peripheral resistance heating element 24 is a ribbon (a flat elongated shape) composed of metal carbide. The outer-peripheral resistance heating element 24 can be manufactured by, for example, applying the paste of the metal carbide by printing. Examples of the metal carbide include tungsten carbide and molybdenum carbide. At 20° C., the volume resistivity of tungsten carbide (WC) is $53\times10^6$ [Ω·m], and the volume resistivity of molybdenum carbide ($Mo_2C$) is $1.4\times10^6$ [Ω·m]. For example, in the case where the amount of heat generation of the outer-peripheral zone Z2 is to be increased, the outer-peripheral resistance heating element 24 may be manufactured by using tungsten carbide that has high resistance, and in the case where the amount of heat generation of the outer-peripheral zone Z2 is to be decreased, the outer-peripheral resistance heating element 24 may be manufactured by using molybdenum carbide that has low resistance.

The high-melting-point metal that is used for the inner-peripheral resistance heating element 22 and the metal carbide that is used for the outer-peripheral resistance heating element 24 are preferably selected from those having a thermal expansion coefficient close to the thermal expansion coefficient of the ceramic plate 20. For example, in the case where the ceramic plate 20 is composed of aluminum nitride, the high-melting-point metal is preferably molybdenum or tungsten, and the metal carbide is preferably molybdenum carbide or tungsten carbide. In the case where the ceramic plate 20 is composed of alumina, the high-melting-point metal is preferably a molybdenum alloy, and the metal carbide is preferably a molybdenum carbide alloy. The resistance heating elements 22 and 24 are disposed so as to detour gas holes 26 and lift pin holes 28. The inner-peripheral resistance heating element 22 is manufactured by using the high-melting-point metal but not by using metal carbide because metal carbide (for example, carbide of Mo or W) is very hard, and installation work when a heater that has a coil shape is embedded is difficult.

The tubular shaft 40 is composed of ceramics such as aluminum nitride or alumina as in the ceramic plate 20. The inner diameter of the tubular shaft 40 is, for example, about 40 mm, and the outer diameter thereof is, for example, about 60 mm. The upper end of the tubular shaft 40 is diffusion-joined to the ceramic plate 20. Power supply rods 42*a* and 42*b* that are connected to the respective terminals 22*a* and 22*b* of the inner-peripheral resistance heating element 22 and power supply rods 44*a* and 44*b* that are connected to the respective terminals 24*a* and 24*b* of the outer-peripheral resistance heating element 24 are disposed in the tubular shaft 40. The power supply rods 42*a* and 42*b* are connected to a first power supply 32, and the power supply rods 44*a* and 44*b* are connected to a second power supply 34. This enables separate temperature control of the inner-peripheral zone 21 that is heated by the inner-peripheral resistance heating element 22 and the outer-peripheral zone Z2 that is heated by the outer-peripheral resistance heating element 24. Gas supply pipes through which gas is supplied to the gas holes 26 and the lift pins that are inserted in the lift pin holes 28 are also disposed in the tubular shaft 40 although these are not illustrated.

Figure 4:
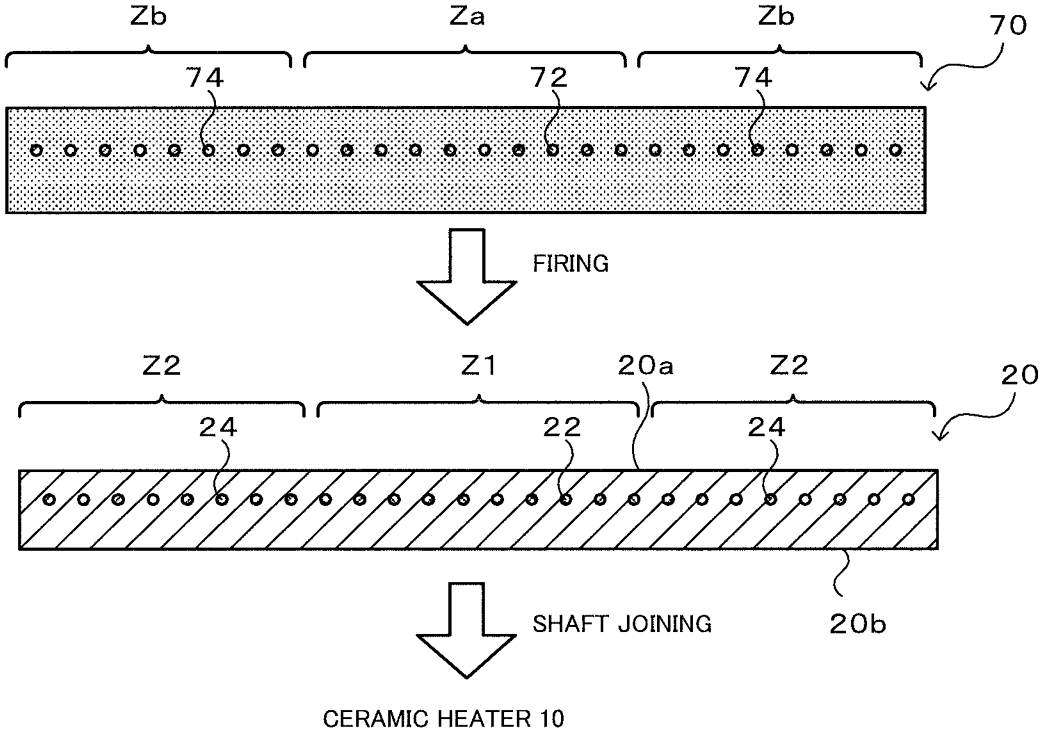
FIG. 4 illustrates a process of manufacturing the ceramic heater 10.

An example of manufacturing the ceramic heater 10 will now be described. FIG. 4 illustrates a process of manufacturing the ceramic heater 10. A pre-firing ceramic precursor 70 is first manufactured. The ceramic precursor 70 is a discoid molded body composed of a ceramic material. An inner-peripheral resistance heating element 72 is embedded in an inner-peripheral zone Za of the ceramic precursor 70 that has a circular shape, and an outer-peripheral resistance heating element 74 is embedded in an outer-peripheral zone Zb that has an annular shape. The inner-peripheral resistance heating element 72 may be a resistance heating element composed of high-melting-point metal. The outer-peripheral resistance heating element 74 may be manufactured by applying the paste of metal carbide by printing. Subsequently, the ceramic precursor 70 is fired in an inert atmosphere (for example, an Ar atmosphere or a nitrogen atmosphere) in a condition in which at least one of the jig, the mold, and the firing furnace used for firing is composed of carbon to manufacture the ceramic plate 20. Firing temperature is, for example, about 1800° C. In a firing process, the atmosphere in the furnace contains carbon. However, the outer-peripheral resistance heating element 74 is composed of the metal carbide and is not further carbonized. Subsequently, the gas holes 26 and the lift pin holes 28 are formed in the ceramic plate 20, the tubular shaft 40 is joined to the back surface of the ceramic plate 20, and the ceramic heater 10 is consequently obtained.

An example of the use of the ceramic heater 10 will now be described. The ceramic heater 10 is first installed in the vacuum chamber not illustrated, and the wafer W is placed on the wafer placement surface 20*a* of the ceramic heater 10. The first power supply 32 adjusts power that is supplied to the inner-peripheral resistance heating element 22 such that the temperature of the inner-peripheral zone Z1 that is detected by an inner-peripheral thermocouple not illustrated becomes a predetermined inner-peripheral target temperature. In addition to this, the second power supply 34 adjusts power that is supplied to the outer-peripheral resistance heating element 24 such that the temperature of the outer-peripheral zone 22 that is detected by an outer-peripheral thermocouple not illustrated becomes a predetermined outer-peripheral target temperature. Consequently, the temperature of the wafer W is controlled so as to be the desired temperature. Settings are adjusted such that the interior of the vacuum chamber becomes a vacuum atmosphere or a decompression atmosphere, plasma is produced in the vacuum chamber, a CVD film is formed on the wafer W by using the plasma, and etching is performed.

As for the ceramic heater 10 according to the present embodiment described above, the ceramic plate 20 contains the carbon component as an impurity. The outer peripheral portion (for example, a range from the outer peripheral edge of the ceramic plate 20 to about 30 mm) of the ceramic heater 10 is likely to have a high temperature, and the carbon concentration thereof increases due to carbon that enters from the outer circumference. For this reason, the outer-peripheral resistance heating element 24 that is disposed in the outer-peripheral zone 22 is likely to be carbonized as a result of reaction with the carbon component that is contained in the ceramic plate 20. According to the present embodiment, however, the outer-peripheral resistance heating element 24 is composed of the metal carbide and is not further carbonized. That is, the amount of heat generation of the outer-peripheral resistance heating element 24 does not become non-uniform. Accordingly, temperature variance can be inhibited from occurring at the outer peripheral portion.

The inner-peripheral resistance heating element 22 and the outer-peripheral resistance heating element 24 are connected to respective different power supplies (the first and second power supplies 32 and 34). This enables separate temperature control of the inner-peripheral zone Z1 and the outer-peripheral zone Z2 of the ceramic heater 10.

The outer-peripheral resistance heating element 24 is composed of the metal carbide. In some cases, however, the workability of metal carbide is poor, and it is difficult to mold into a three-dimensional shape (for example, a coil). According to the present embodiment, the outer-peripheral resistance heating element 24 has a two-dimensional shape and can accordingly be readily manufactured by printing.

The present invention is not limited to the above-described embodiment, and can be carried out by various modes as long as they belong to the technical scope of the invention.

Figure 5:
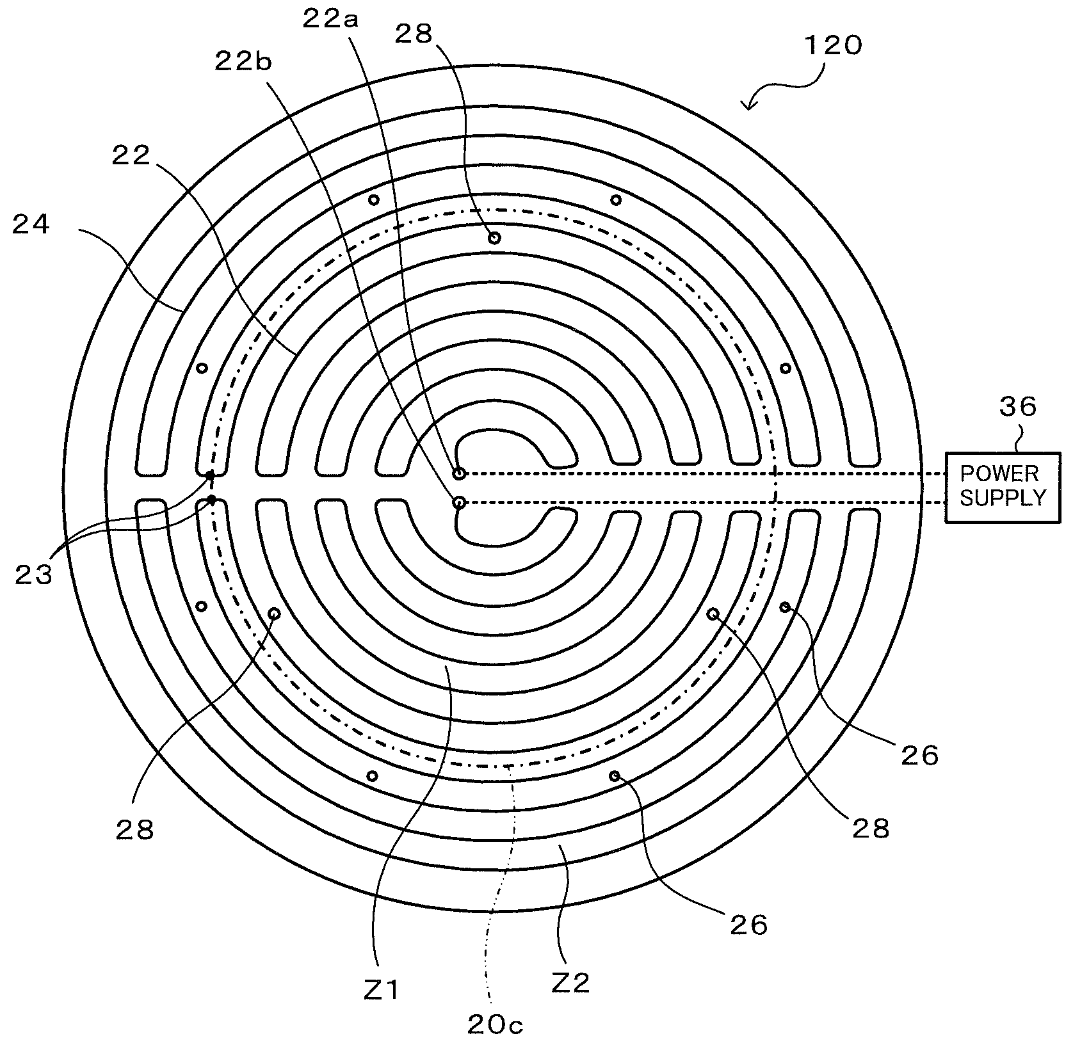
FIG. 5 is a sectional view of a ceramic plate 120 taken along a plane parallel with the resistance heating elements 22 and 24 and viewed from above.

For example, according to the embodiment described above, the inner-peripheral resistance heating element 22 and the outer-peripheral resistance heating element 24 are separately connected to the first and second power supplies 32 and 34. As illustrated in FIG. 5, however, the inner-peripheral resistance heating element 22 and the outer-peripheral resistance heating element 24 may be connected to each other in series at a connection point 23 on the imaginary boundary 20*c*, and both of the terminals 22*a* and 22*b* may be connected to a single power supply 36. In FIG. 5, like signs designate components like to those according to the embodiment described above. This enables the temperatures of the inner-peripheral zone 21 and the outer-peripheral zone 22 of the ceramic heater 10 to be controlled by using the common power supply 36.

According to the embodiment described above, the outer-peripheral resistance heating element 24 is entirely manufactured by using the metal carbide. However, only the surface is manufactured by using the metal carbide, and the interior may be manufactured by using metal (for example, high-melting-point metal).

According to the embodiment described above, the inner-peripheral resistance heating element 22 is a resistance heating element that does not include a thin film composed of carbide on a surface and that is composed of the high-melting-point metal but may be a resistance heating element that includes a thin film composed of carbide of high-melting-point metal on a surface and that is composed of the high-melting-point metal. In this case, the thickness of the thin film composed of carbide is preferably thickness (for example, several μm) adjusted to such an extent that the characteristics of the resistance heating element composed of the high-melting-point metal are not affected.

According to the embodiment described above, the inner-peripheral resistance heating element 22 is the coil, and the outer-peripheral resistance heating element 24 is the ribbon but these are not particularly limited thereto, and any shape may be used. For example, the inner-peripheral resistance heating element 22 may have a two-dimensional shape such as a ribbon shape or a mesh shape. The outer-peripheral resistance heating element 24 may have a three-dimensional shape such as a coil shape. However, the workability of some metal carbide such as tungsten carbide is poor. In this case, a two-dimensional shape such as a ribbon shape or a mesh shape is preferably used instead of the three-dimensional shape. The reason is that the two-dimensional shape enables manufacturing by applying the paste of metal carbide by printing, and there is no problem about the workability of the metal carbide.

According to the embodiment described above, the ceramic plate 20 may contain an electrostatic electrode. In this case, the wafer W can be electrostatically sucked and held on the wafer placement surface 20*a* by applying a voltage to the electrostatic electrode after the wafer W is placed on the wafer placement surface 20*a*. The ceramic plate 20 may contain a RF electrode. In this case, a shower head, not illustrated, is disposed with a space created above the wafer placement surface 20*a*, and high-frequency power is supplied between parallel flat plate electrodes including the shower head and the RF electrode. In this way, plasma is produced, a CVD film can be formed on the wafer W by using the plasma, and etching can be performed. The electrostatic electrode may double as the RF electrode.

According to the embodiment described above, the outer-peripheral zone Z2 is described as a single zone but may be divided into small zones. In this case, the resistance heating elements are separately wired for every small zone. Each small zone may be formed into an annular shape by dividing the outer-peripheral zone Z2 by a boundary line concentric with the ceramic plate 20 or may be formed into a sectorial shape (a shape obtained by unfolding the side surface of a truncated cone) by dividing the outer-peripheral zone 22 by lines radially extending from the center of the ceramic plate 20. The resistance heating elements that are wired in all of the small zones may be manufactured by using metal carbide. However, at least the resistance heating element that is wired in a small zone at the outermost circumference (a zone that can have the maximum temperature, for example, within a range from the outer peripheral edge of the ceramic plate to 30 mm) may be manufactured by using metal carbide.

According to the embodiment described above, the inner-peripheral zone Z1 is described as a single zone but may be divided into multiple small zones. In this case, the resistance heating elements are separately wired for every small zone. Each small zone may be formed into an annular shape and a circular shape by dividing the inner-peripheral zone Z1 by a boundary line concentric with the ceramic plate 20 or may be formed into a sectorial shape (a shape obtained by unfolding the side surface of a cone) by dividing the inner-peripheral zone 21 by lines radially extending from the center of the ceramic plate 20.

In the example of manufacturing the ceramic heater 10 according to the embodiment described above, the outer-peripheral resistance heating element 74 is manufactured by applying the paste of the metal carbide by printing. However, a resistance heating element that has at least a surface composed of metal carbide may be embedded in the ceramic precursor 70. In this case, a resistance heating element composed of high-melting-point metal is prepared before the outer-peripheral resistance heating element 74 is embedded in the ceramic precursor 70, and at least the surface of the resistance heating element (or the entire resistance heating element) is carbonized to manufacture the outer-peripheral resistance heating element 74, and the outer-peripheral resistance heating element 74 is embedded in the ceramic precursor 70. Also, in this case, there is carbon in the furnace in the firing process. However, since the surface of the outer-peripheral resistance heating element 74 is carbonized, the outer-peripheral resistance heating element 74 is not further carbonized.

In the example of manufacturing the ceramic heater 10 according to the embodiment described above, the inner-peripheral resistance heating element 72 that is embedded in the ceramic precursor 70 may be a resistance heating element that has no carbide film and that is composed of high-melting-point metal. In this case, the inner-peripheral zone Za of the ceramic precursor 70 is unlikely to have a high temperature and is unlikely to have a high carbon concentration unlike the outer-peripheral zone Zb. For this reason, even when a carbide film is formed on the surface of the inner-peripheral resistance heating element 72 in the firing process, the thickness of the carbide film is thickness (for example, several μm) adjusted to such an extent that the characteristics of the inner-peripheral resistance heating element 72 composed of the high-melting-point metal are not affected.

The present application claims priority from Japanese Patent Application No. 2019-11299 filed Jan. 25, 2019, the entire contents of which are incorporated herein by reference.

What is claimed is:

1. A ceramic heater comprising:

a ceramic plate that has a wafer placement surface and that has an inner-peripheral zone having a circular shape and an outer-peripheral zone having an annular shape;

an inner-peripheral resistance heating element that is disposed in the inner-peripheral zone and that is composed of high-melting-point metal; and an outer-peripheral resistance heating element that is disposed in the outer-peripheral zone and wherein the portion of the outer-peripheral resistance heating element that is located at the outer most peripheral portion of the outer-peripheral zone has at least a surface composed of metal carbide; and wherein the outer most peripheral portion ranges from the outer peripheral edge of the ceramic plate to about 30 mm inward from the outer peripheral edge of the ceramic plate.

2. The ceramic heater according to claim 1, wherein the inner-peripheral resistance heating element and the outer-peripheral resistance heating element are connected to respective different power supplies.

3. The ceramic heater according to claim 1, wherein the inner-peripheral resistance heating element and the outer-peripheral resistance heating element are connected to each other in series and are connected to a single power supply.

4. The ceramic heater according to claim 1, wherein the high-melting-point metal is at least one kind of metal selected from a group consisting of tungsten, molybdenum, and an alloy thereof, and wherein the metal carbide is tungsten carbide or molybdenum carbide.

5. The ceramic heater according to claim 1, wherein the portion of the outer-peripheral resistance heating element that is located at the outer most peripheral portion of the outer-peripheral zone has the entire portion composed of metal carbide.

6. The ceramic heater according to claim 1, wherein the outer-peripheral resistance heating element has a two-dimensional shape.

7. The ceramic heater according to claim 1, wherein the inner-peripheral resistance heating element includes a thin film composed of carbide of the high-melting-point metal on a surface.

8. A method of manufacturing a ceramic heater, the method comprising:

a firing step of firing a pre-firing ceramic precursor that includes an inner-peripheral resistance heating element that is embedded in an inner-peripheral zone and an outer-peripheral resistance heating element that is embedded in an outer-peripheral zone in an inert atmosphere in a condition in which at least one of a jig, a mold, and a firing furnace used for firing is composed of carbon to manufacture a ceramic plate; and a preprocessing step of preparing a resistance heating element composed of high-melting-point metal before the outer-peripheral resistance heating element is embedded in the ceramic precursor, carbonizing at least a surface of the portion of the outer-peripheral resistance heating element composed of the high-melting-point metal that will be located at the outer most peripheral portion of the outer-peripheral zone to manufacture the outer-peripheral resistance heating element, and embedding the outer-peripheral resistance heating element in the ceramic precursor; and wherein the outer most peripheral portion ranges from the outer peripheral edge of the ceramic plate to about 30 mm inward from the outer peripheral edge of the ceramic plate.

9. The method of manufacturing a ceramic heater according to claim 8, wherein the entire portion of the outer peripheral resistance heating element that will be located at the outer most peripheral portion of the outer-peripheral zone is carbonized in the preprocessing step.

* * * * *